United States Patent
Danisik et al.

(10) Patent No.: US 10,505,787 B2
(45) Date of Patent: Dec. 10, 2019

(54) AUTOMATIC RECOVERY IN REMOTE MANAGEMENT SERVICES

(71) Applicants: Bahadir Danisik, Austin, TX (US); Jigang Yang, Cedar Park, TX (US)

(72) Inventors: Bahadir Danisik, Austin, TX (US); Jigang Yang, Cedar Park, TX (US)

(73) Assignee: Nokia of America Corporation, Murray Hill, NJ (US)

( * ) Notice: Subject to any disclaimer, the term of this patent is extended or adjusted under 35 U.S.C. 154(b) by 111 days.

(21) Appl. No.: 15/444,212

(22) Filed: Feb. 27, 2017

(65) Prior Publication Data
US 2018/0248744 A1     Aug. 30, 2018

(51) Int. Cl.
| | |
|---|---|
| G06F 15/177 | (2006.01) |
| H04L 12/24 | (2006.01) |
| H04L 29/14 | (2006.01) |
| H04L 29/08 | (2006.01) |

(52) U.S. Cl.
CPC ...... *H04L 41/0654* (2013.01); *H04L 41/0672* (2013.01); *H04L 41/0681* (2013.01); *H04L 41/28* (2013.01); *H04L 67/1031* (2013.01); *H04L 67/1034* (2013.01); *H04L 69/40* (2013.01); *H04L 41/0886* (2013.01)

(58) Field of Classification Search
CPC . H04L 67/1034; H04L 67/1031; H04L 69/40; H04L 41/0672; H04L 41/0886
See application file for complete search history.

(56) References Cited

U.S. PATENT DOCUMENTS

| | | |
|---|---|---|
| 8,145,746 B1 | 3/2012 | Singh et al. |
| 8,832,259 B1 | 9/2014 | Kearns et al. |
| 9,032,070 B1 | 5/2015 | Stickle et al. |
| 2003/0204769 A1 | 10/2003 | Coughlin |
| 2005/0132030 A1 | 6/2005 | Hopen |

(Continued)

OTHER PUBLICATIONS

Broadband Forum, "CPE WAN Management Protocol v1.1," TR-069, Issue 1, Amendment 2, Dec. 2007, 138 pages.

(Continued)

*Primary Examiner* — Padma Mundur
(74) *Attorney, Agent, or Firm* — Tong, Rea, Bentley & Kim, LLC

(57) ABSTRACT

The present disclosure generally discloses improvements in computer performance for supporting automatic recovery for a remote management service (RMS) based on an RMS automatic recovery capability. The RMS automatic recovery capability may be configured to support automatic recovery for an RMS by supporting automatic recovery for a managed device that is experiencing a device authentication failure. The RMS automatic recovery capability may be configured to support automatic recovery for an RMS based on configuration of a load balancer of the RMS to recognize an authentication failure of a managed device and to trigger the managed device to enter a bootstrap process based on recognition of the authentication failure of the managed device. The RMS automatic recovery capability may be configured to support automatic recovery for an RMS based on configuration of a managed device to initiate a bootstrap process based on an indication from a load balancer of the RMS.

25 Claims, 6 Drawing Sheets

(56) References Cited

U.S. PATENT DOCUMENTS

| | | |
|---|---|---|
| 2006/0123285 A1* | 6/2006 | De Araujo .......... G06F 11/0712 |
| | | 714/721 |
| 2011/0125898 A1 | 5/2011 | Hassan et al. |
| 2011/0276695 A1 | 11/2011 | Maldaner |
| 2012/0102465 A1 | 4/2012 | Bates |
| 2012/0131555 A1 | 5/2012 | Hossain et al. |
| 2013/0013752 A1* | 1/2013 | Herrera Van Der Nood ............... |
| | | H04L 41/0886 |
| | | 709/220 |
| 2013/0054822 A1 | 2/2013 | Mordani et al. |
| 2013/0219363 A1 | 8/2013 | Wu et al. |
| 2013/0326044 A1 | 12/2013 | Maldaner |
| 2014/0006479 A1 | 1/2014 | Maloo |
| 2014/0129613 A1* | 5/2014 | Van Depoel .......... H04L 67/125 |
| | | 709/202 |
| 2017/0093868 A1* | 3/2017 | Slavov .................... H04W 4/70 |

OTHER PUBLICATIONS

International Search Report and Written Opinion of corresponding PCT Application No. PCT/US2018/019836, dated May 22, 2018, 14 pages.

\* cited by examiner

AUTOMATIC RECOVERY IN REMOTE MANAGEMENT SERVICES

TECHNICAL FIELD

The present disclosure relates generally to communication networks and, more particularly but not exclusively, to improvements in computer performance for supporting recovery in remote management services.

BACKGROUND

Remote management services may be used for remote management of devices. For example, one popular type of remote management service for remote device management is the Automatic Configuration Service, which enables Automatic Configuration Servers (ACSs) to perform remote device management of customer premises equipment (CPE) or network equipment. While such remote management services may enable efficient management of devices remotely, many such remote management services struggle to support certain types of functions.

SUMMARY

The present disclosure generally discloses improvements in computer performance for supporting recovery in remote management services.

In at least some embodiments, an apparatus is provided. The apparatus includes a processor and a memory communicatively connected to the processor. The processor is configured to receive, by a load balancer associated with the remote management service from a managed device, a message of the managed device. The processor is configured to send, by the load balancer toward a managing device of the remote management service, the message of the managed device. The processor is configured to receive, by the load balancer from the managing device, a response message indicative of an error associated with processing of the message of the managed device. The processor is configured to send, by the load balancer toward the managed device based on the response message indicative of the error associated with processing of the message of the managed device, a response message comprising bootstrap information associated with the remote management service. In at least some embodiments, a non-transitory computer-readable storage medium stores instructions which, when executed by a computer, cause the computer to perform a corresponding method for supporting recovery in remote management services. In at least some embodiments, a corresponding method for supporting recovery in remote management services is provided.

In at least some embodiments, an apparatus is provided. The apparatus includes a processor and a memory communicatively connected to the processor. The processor is configured to send, by a managed device toward a load balancer associated with the remote management service, a message for processing by the remote management service. The processor is configured to receive, by the managed device from the load balancer, a response message including bootstrap information associated with the remote management service. The processor is configured to send, from the managed device toward the load balancer based on the bootstrap information associated with the remote management service, a bootstrap request message. In at least some embodiments, a non-transitory computer-readable storage medium stores instructions which, when executed by a computer, cause the computer to perform a corresponding method for supporting recovery in remote management services. In at least some embodiments, a corresponding method for supporting recovery in remote management services is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses improvements in computer performance for supporting automatic recovery for a remote management service (RMS) based on an RMS automatic recovery capability. The RMS automatic recovery capability may be configured to enable automatic recovery within the context of an RMS configured to support remote management of a managed device(s) by a managing device (s). The RMS automatic recovery capability may be configured to support automatic recovery for an RMS by supporting automatic recovery for a managed device that is experiencing a device authentication failure. The RMS automatic recovery capability may be configured to support automatic recovery for an RMS based on configuration of a load balancer of the RMS to recognize an authentication failure of a managed device and to trigger the managed device to enter a bootstrap process based on recognition of the authentication failure of the managed device. The RMS automatic recovery capability may be configured to support automatic recovery for an RMS based on configuration of a load balancer of the RMS to trigger a managed device to enter a bootstrap process based on a determination that a threshold number of authentication failures have occurred for the managed device. The RMS automatic recovery capability may be configured to support automatic recovery for an RMS based on configuration of a load balancer of the RMS to trigger a managed device to enter a bootstrap process by sending bootstrap information to the managed device based on a determination to trigger the managed device to enter the bootstrap process (e.g., a determination that a threshold number of authentication failures have occurred for the managed device). The RMS automatic recovery capability may be configured to support automatic recovery for an RMS based on configuration of a managed device to initiate a bootstrap process based on an indication from a load balancer of the RMS. The RMS for which the RMS automatic recovery capability is provided may be an Automatic Configuration Service, which enables Automatic Configuration Servers (ACSs) to perform remote device management of customer premises equipment (CPE) and which typically uses the TR-069 protocol for remote management of CPEs by the ACSs, and is primarily presented herein with this context; however, it will be appreciated that various embodiments of the RMS automatic recovery capability may be adapted for use with other types of RMSs. It will be appreciated that these and various other embodiments and potential advantages of the RMS automatic recovery capability may be further understood by way of reference to the example communication system of FIG. 1.

Figure 1:
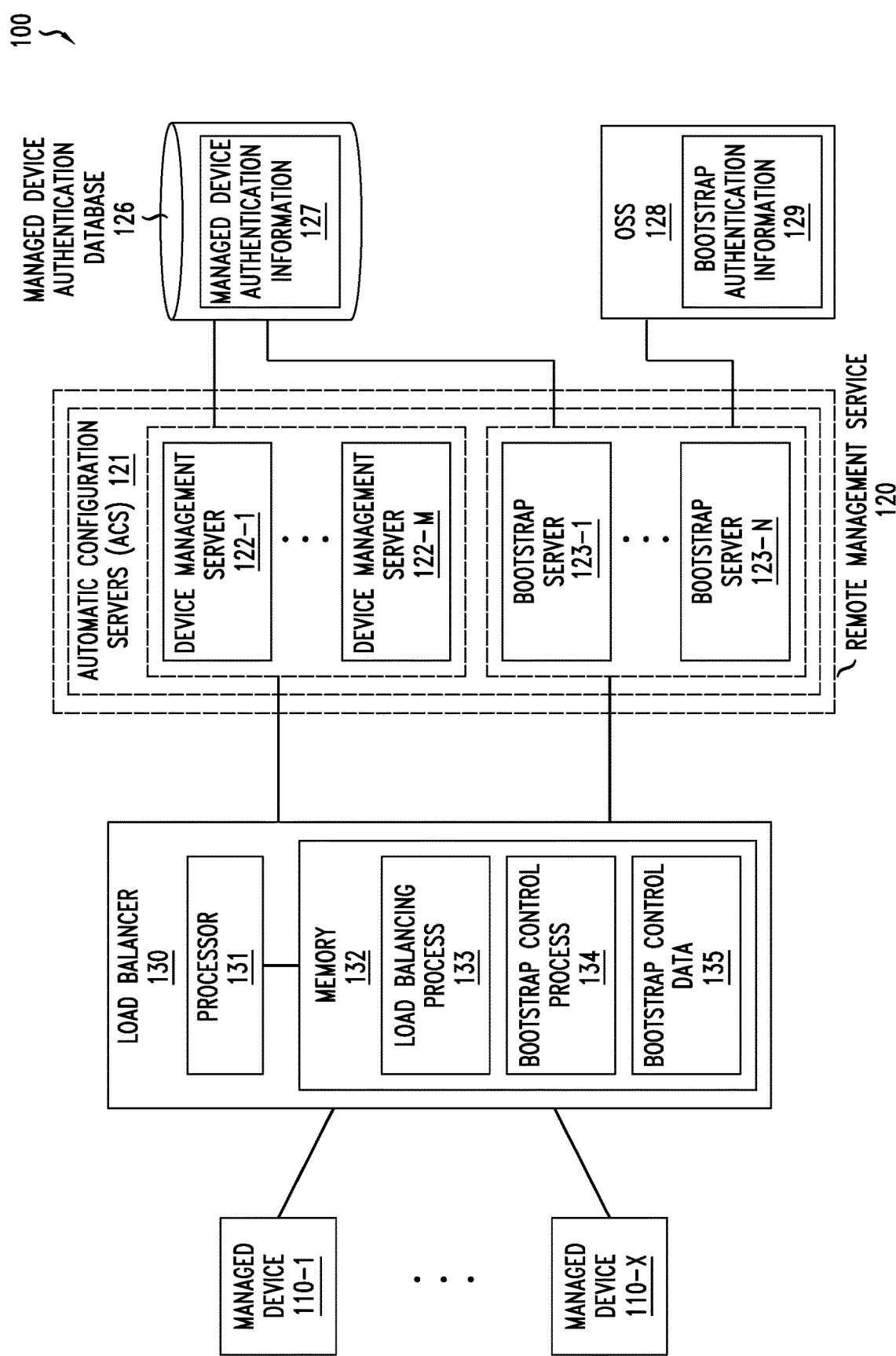
FIG. 1 depicts an example communication system configured to support automatic recovery for a remote management service.

FIG. 1 depicts an example communication system configured to support automatic recovery for a remote management service.

The communication system 100 includes a set of managed devices (MDs) 110-1-110-X (collectively, MDs 110), a remote management service (RMS) 120, and load balancer (LB) 130.

The MDs 110 are devices configured to be managed by the RMS 120. For example, the MDs 110 may be customer premises equipment (CPEs), network elements (NEs), or the like. The MDs 110 are communicatively connected to the LB 130 such that the MDs 110 may communicate with the RMS 120 (e.g., with devices configured to provide the RMS 120, as discussed further below) via the LB 130, although it is noted that the LB 130 may be transparent to the MDs 110. It will be appreciated the MDs 110 may be communicatively connected to the LB 130 via one or more communication networks (omitted for purposes of clarity, but which may include any communication networks configured to support communication between MDs 110 and LB 130, such as WiFi networks, cellular networks, optical networks Ethernet networks, or the like, as well as various combinations thereof), which may depend on the service type of the RMS 120, the device types of the MDs 110 (e.g., CPE or NE), or the like, as well as various combinations thereof. The MDs 110, as discussed further below, may be configured to perform various functions in support of the RMS automatic recovery capability.

The RMS 120 is a remote management service configured to manage MDs 110. The RMS 120, as discussed further below, includes various devices configured to perform remote device management for the MDs 110. The RMS 120 (and, more specifically, the devices providing the RMS 120) is communicatively connected to the LB 130 such that the RMS 120 (again, the devices providing the RMS 120) may communicate with the MDs 110 via the LB 130. It will be appreciated the RMS 120 (again, the devices providing the RMS 120) may be communicatively connected to the LB 130 via one or more communication networks (omitted for purposes of clarity, but which may include any communication networks configured to support communication between RMS 120 and LB 130, which may depend on the service type of the RMS 120, the deployment locations of the RMS 120 and the LB 130, or the like, as well as various combinations thereof. The RMS 120, as illustrated in FIG. 1, has access to a managed device authentication database 126 storing managed device authentication information 127 that is associated with the MDs 110 (e.g., a mapping of identifiers of MDs 110 to respective authentication credentials for the MDs 110). The RMS 120, as discussed further below, may be configured to perform various functions in support of the RMS automatic recovery capability.

The RMS 120, in the example system 100 of FIG. 1, is assumed to be an automatic configuration service that is provided using a set of automatic configuration servers (ACSs) 121. The set of ACSs 121 includes a set of device management servers (DMSs) 122-1-122-M (collectively, DMSs 122) and a set of bootstrap servers (BSs) 123-1-123-N (collectively, BSs 123). The DMSs 122 and BSs 123 of the RMS 120 each may have access to a managed device authentication database 126 storing managed device authentication information 127.

The DMSs 122 of RMS 120 are ACSs that are configured to perform various device management functions for MDs 110. The device management functions supported by the DMSs 122 for the MDs 110 may include device authentication functions (e.g., authenticating the MDs 110 to be managed by the RMS 120, which may be performed responsive to messages received from the MDs 110 for processing by the DMSs 122), device message processing capabilities (e.g., processing messages received from MDs 110, or the like, as well as various combinations thereof). The device management functions supported by the DMSs 122 for the MDs 110 may include various device management functions typically performed by an ACS device management server based on TR-069, such as responding to messages from MDs 110, responding to instructions from the automatic configuration service, executing management actions (e.g., executing TR-069 Remote Procedure Calls (RPCs) such as GetParameterValues and SetParameterValues, downloading firmware or software to MDs 110, or the like), or the like, as well as various combinations thereof. The device management functions supported by the DMSs 122 for MDs 110 may be performed responsive to various events and conditions, such as responsive to messages from MDs 110 (e.g., TR-069 Inform messages, which may be triggered responsive to events like booting of MDs 110, bootstrapping of MDs 110, value changes of parameters of or for MDs 110, period scheduling events for MDs 110, or the like), responsive to requests by the automatic configuration service (e.g., bulk device management or other event-based mechanisms), responsive to requests by operations support systems (e.g., using the North Bound System (NBS) of ACS), or the like, as well as various combinations thereof. The device management functions typically performed by an ACS device management server, as well as the events and conditions which may trigger such device management functions to be performed by an ACS device management server, will be understood by one of ordinary skill in the art. The DMSs 122 each may have access to the managed device authentication information 127 of the managed device authentication database 126, for use by the DMSs 122 in determining whether the MDs 110 are authorized to be managed by the RMS 120. The DMSs 122 may be dedicated devices (e.g., servers), virtual machines (VMs) configured to provide instances of the DMSs 122, or the like). The number M of DMSs 122 of the RMS 120 may depend on the number of MDs 110 being managed and frequency of management actions, and may be increased and decreased elastically (e.g., via instantiation and termination of VMs providing instances of the DMSs 122). The DMSs 122, as discussed further below, may be configured to perform various functions in support of the RMS automatic recovery capability.

The BSs 123 of RMS 120 are ACSs that are configured to perform bootstrap functions for the MDs 110. The bootstrap functions supported by the BSs 123 may include bootstrap functions typically performed by bootstrap servers for devices such as the MDs 110. For example, bootstrap functions performed by a BS 123 for an MD 110 may include receiving a bootstrap request from the MD 110, authenticating the MD 110 (e.g., authenticating that the MD 110 is authorized to be managed by the RMS 120), generating managed device credentials for the MD 110 and providing the managed device credentials for the MD 110 to the MD 110 (e.g., for use by the MD 110 in authenticating itself to the RMS 120 (e.g., to the DMSs 122 of the RMS 120)) and to the RMS 120 (e.g., for storage as part of the managed device authentication information 127 for use by DMSs 122 in authorizing the MD 110). The BSs 123 each may have access to the managed device authentication database 126 such that the BSs 123 may update the managed device authentication information 127 of MDs 110 responsive to successful bootstrapping of the MDs 110. The BSs 123 each may be configured to communicate with an operations support system (OSS) 128 configured to determine whether the MDs 110 are authorized to be managed by the RMS 120. The OSS 128 may store bootstrap authentication information 129 (e.g., bootstrap credentials or other related bootstrap authentication information) configured for use in determining, during bootstrapping of MDs 110, whether the MDs 110 are authorized to be managed by the RMS 120. The BSs 123 may be dedicated devices (e.g., servers), virtual machines (VMs) configured to provide instances of the BSs 123, or the like). The number N of BSs 123 of the RMS 120 may depend on the number of MDs 110 being managed and frequency of management actions (although it is expected, but not required, that the number N of BSs 123 of the RMS 120 will be less than the number M of DMSs 122 of the RMS 120, as not all MDs 110 are expected to need bootstrapping at the same time), and may be increased and decreased elastically (e.g., via instantiation and termination of VMs providing instances of the BSs 123). The BSs 123, as discussed further below, may be configured to perform various functions in support of the RMS automatic recovery capability.

The communication between the MDs 110 and the RMS 120, by which RMS 120 may provide automatic management functions for the MDs 110, may be based on any suitable management protocol. The management protocol may be an application layer protocol. In the example system 100 of FIG. 1, the RMS 120 is an automatic configuration service based on the sets of ACSs 121, where it will be understood that ACSs typically use the TR-069 protocol for remote management of CPEs (illustratively, the MDs 110). The TR-069 protocol is a technical specification, published by the Broadband Forum and entitled CPE WAN Management Protocol (CWMP), which defines an application layer protocol for remote management of devices, including end user devices and network device. It will be appreciated that, although primarily presented herein with respect to use of TR-069 as the management protocol by which the MDs 110 are remotely managed by the RMS 120, various other remote management protocols may be used.

The LB 130 is a load balancer configured to provide various functions for the RMS 120, including load balancing functions, bootstrap control functions, or the like, as well as various combinations thereof. The LB 130 is configured to recognize an authentication failure of an MD 110 and to trigger the MD 110 to enter a bootstrap process based on recognition of the authentication failure of the MD 110. The LB 130 is configured to trigger an MD 110 to enter a bootstrap process based on a determination that a threshold number of authentication failures have occurred for the MD 110. The LB 130 is configured to trigger an MD 110 to enter a bootstrap process by sending bootstrap information to the MD 110 based on a determination to trigger the MD 110 to enter the bootstrap process (e.g., a determination that a threshold number of authentication failures have occurred for the MD 110). The LB 130 includes a processor 131 and a memory 132 communicatively connected to the processor 131. The memory 132 stores a load balancing process 133, a bootstrap control process 134, and bootstrap control data 135. The LB 130 may be implemented using one or more dedicated devices, one or more virtual machines (VMs), or the like.

The LB 130 is configured to provide load balancing functions for the RMS 120, thereby facilitating remote management of the MDs 110 by the RMS 120. The processor 131 is configured to execute the load balancing process 133 for enabling the LB 130 to perform load balancing functions for balancing load of MDs 110 across the DMSs 122 of the RMS 120. For example, the load balancing functions may include selection of DMSs 122 for new sessions of MDs 110, support for session stickiness for sessions of MDs 110 (e.g., once a session is established between an MD 110 and one of the DMSs 122, all communication of that session is between the MD 110 and the one of the DMSs 122). The load balancing functions typically performed by a load balancer for a remote management service such as the RMS 120 will be understood by one of ordinary skill in the art.

The LB 130 is configured to provide bootstrap control functions for the RMS 120, thereby facilitating bootstrapping of the MDs 110 by the RMS 120. The processor 131 is configured to execute the bootstrap control process 134, based on bootstrap control data 135, to enable LB 130 to perform bootstrap control functions for controlling bootstrapping of MDs 110 by BSs 123 of RMS 120. The bootstrap control process 134 may be configured to facilitate bootstrapping of the MDs 110 by the RMS 120 based on authentication failures of the MDs 110. The bootstrap control process 134 may be configured to monitor response messages received from DMSs 122 for indications of errors (e.g., for error codes indicative of authentication failures in which the DMSs 122 were unable to successfully authenticate MDs 110 which sent messages for processing by DMSs 122 of the RMS 120). For example, where a message of an MD 110 that is sent for processing by the RMS is received via a Hypertext Transfer Protocol (HTTP) connection, a response message indicative of an error may be an HTTP message including a 401 error code. The bootstrap control process 134 may be configured to trigger an MD 110 to enter a bootstrap process based on a determination that a threshold number of authentication failures have occurred for the MD 110. The threshold may be set at any suitable value (e.g., one, three, five, or the like) and may vary under certain conditions (e.g., per MD 110, per MD type, or the like). The bootstrap control process 134 may be configured to maintain error count information for MDs 110 for use in determining whether to trigger an MD 110 to enter a bootstrap process based on a determination that a threshold number of authentication failures have occurred for the MD 110 (e.g., for use in determining whether a detection of an error for the MD 110 causes the threshold number of authentication failures for the MD 110 to satisfy the associated threshold such that the MD 110 is to be triggered to enter a bootstrap process). The bootstrap control process 134 may be configured to trigger an MD 110 to enter a bootstrap process by sending bootstrap information to the MD 110 based on a determination to trigger the MD 110 to enter the bootstrap process (e.g., a determination that a threshold number of authentication failures have occurred for the MD 110). The bootstrap information may include a load balancer address of the LB 130 that is associated with bootstrap functions supported by the RMS 120 (e.g., associated with the BSs 123 of the RMS 120) and bootstrap credentials for use by the RMS 120 is performing bootstrapping for the MD 110. The bootstrap control process 134 (or, more generally, the LB 130) may be configured to perform various other functions for controlling bootstrapping of MDs 110 responsive to errors such as authentication failures.

The LB 130 may be configured to provide various other types of functions for the RMS 120.

Figure 2:
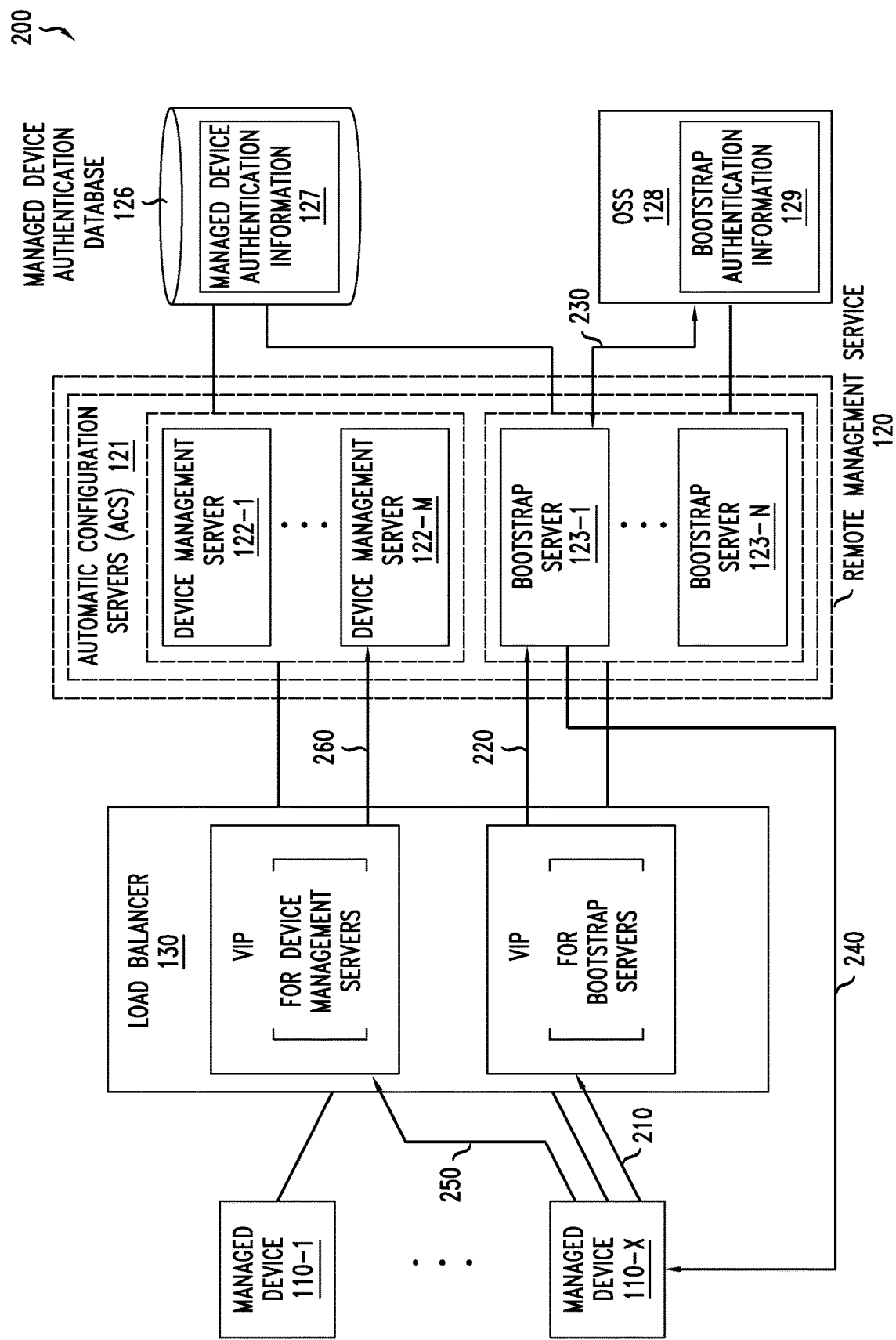
FIG. 2 depicts an example process, within the context of the example communication system of FIG. 1, for supporting automatic recovery for a remote management service.
Figure 3:
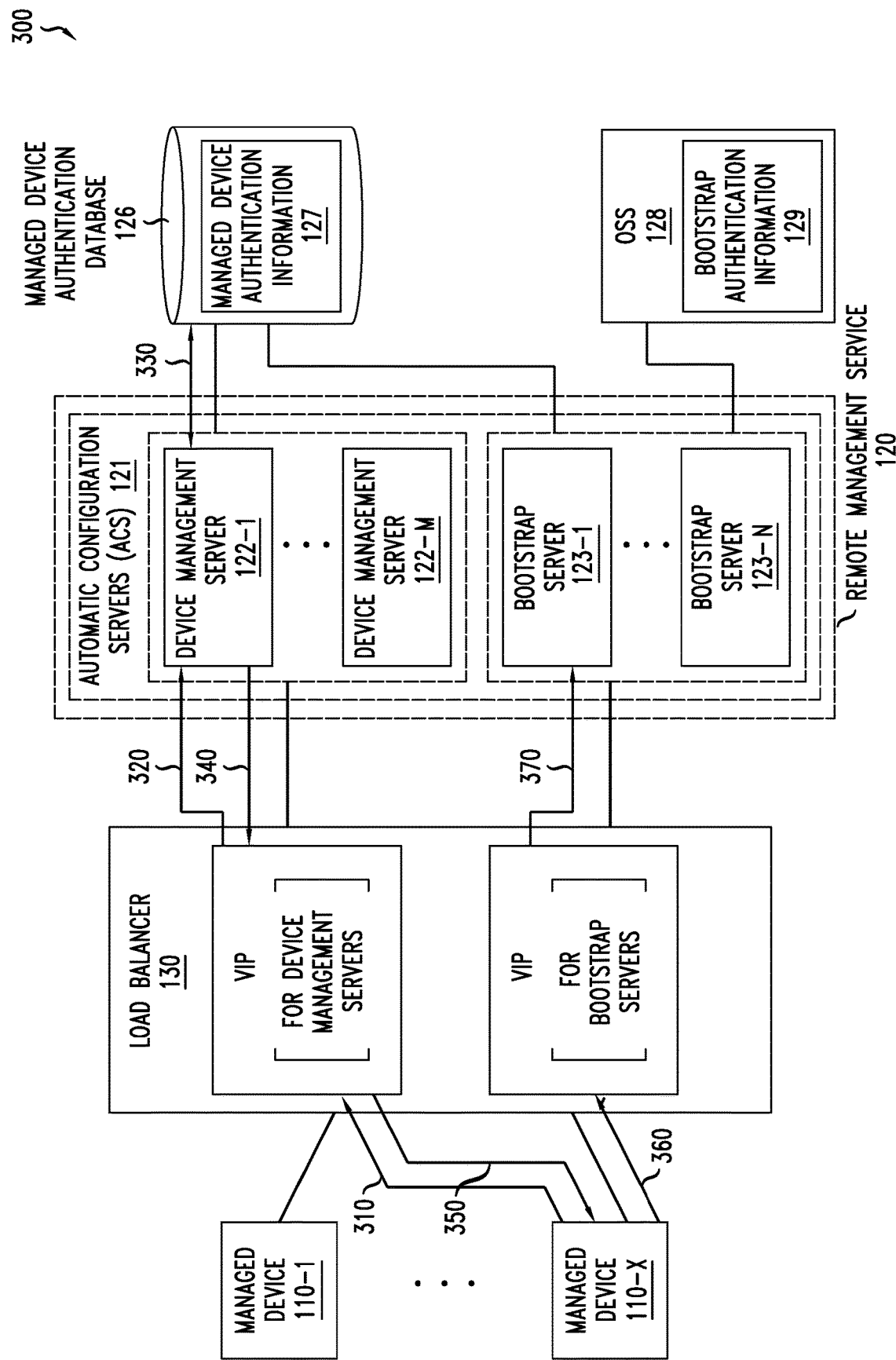
FIG. 3 depicts an example process, within the context of the example communication system of FIG. 1, for supporting automatic recovery for a remote management service.

It is noted that the operation of various elements of system 100 of FIG. 1 in performing functions in support of the RMS automatic recovery capability may be further understood with respect to the example processes presented with respect to FIG. 2 and FIG. 3.

FIG. 2 depicts an example process, within the context of the example communication system of FIG. 1, for supporting automatic recovery for a remote management service.

The bootstrap process 200 of FIG. 2 is a process by which an MD 110 becomes registered with the RMS 120 and under management of the RMS 120.

The bootstrap process 200 of FIG. 2 may be performed as an initial bootstrap process (e.g., before an authentication failure as presented in FIG. 3) or as an automatic recovery bootstrap process (e.g., after an authentication failure as presented in FIG. 3).

The bootstrap process 200 of FIG. 2 is presented within the context of the communication system 100 of FIG. 1 and includes a set of steps which may be performed by elements of the communication system 100 of FIG. 1 for supporting bootstrapping of one of the MDs 110 (illustratively, in FIG. 2, MD 110-X).

At step 210, the MD 110-X sends a bootstrap request to the LB 130. The bootstrap request includes bootstrap information, which includes a load balancer address of the LB 130 that is associated with bootstrap functions supported by the RMS 120 (illustratively, a virtual IP (VIP) address of the LB 130 that is associated with the set of BSs 123 of the RMS 120) and bootstrap credentials. The bootstrap credentials include credentials which the RMS 120 (illustratively, one of the BSs 123 of RMS 120) may use to verify that the MD 110-X is authorized to be managed by the RMS 120. If the bootstrap process 200 is an initial bootstrap process (e.g., before an authentication failure as presented in FIG. 3), then the bootstrap credentials may be factory default credentials or may be acquired default credentials that have been acquired by the MD 110-X. If the bootstrap process 200 is an automatic recovery bootstrap process (e.g., after an authentication failure as presented in FIG. 3), then the bootstrap credentials are those provided by the LB 130 to the MD 110-X (as presented with respect to FIG. 3). The bootstrap request may be a TR-069 Inform message.

At step 220, the LB 130 sends the bootstrap request of the MD 110-X to one of the BSs 123 of the RMS 120 (illustratively, BS 123-1). The LB 130 selects the BS 123-1 of the RMS 120 for the bootstrap request of the MD 110-X and provides the bootstrap request of the MD 110-X to the BSs 123-1 of the RMS 120. The LB 130 may select the BS 123-1 for the bootstrap request of the MD 110-X based on any suitable load balancing technique.

At step 230, the BS 123-1 authenticates the MD 110-X. The BS 123-1 authenticates the MD 110-X to verify that the MD 110-X is authorized to be managed by the RMS 120. The BS 123-1 authenticates the MD 110-X based on the bootstrap credentials of the bootstrap request of the MD 110-X. The BS 123-1 may authenticate the MD 110-X by interacting with the OSS 128 to determine whether the MD 110-X is authorized to be managed by the RMS 120. For example, BS 123-1 may send an authentication request to the OSS 128 (e.g., including an identifier of the MD 110-X and the bootstrap credentials received in the bootstrap request of the MD 110-X) and receive a response from the OSS 128 that is indicative as to whether or not the MD 110-X is authorized to be managed by the RMS 120 (e.g., the OSS 128 determines whether or not the MD 110-X is authorized to be managed by the RMS 120). For example, the BS 123-1 may send a request for comparative bootstrap credentials for MD 110-X to the OSS 128 (e.g., based on an identifier of the MD 110-X), receive the comparative bootstrap credentials for MD 110-X from the OSS 128, and compare the bootstrap credentials received in the bootstrap request of the MD 110-X and the comparative bootstrap credentials for MD 110-X that are received from the OSS 128 to determine whether or not the MD 110-X is authorized to be managed by the RMS 120. Here, it is assumed that the MD 110-X is successfully authenticated by the BS 123-1 as being authorized to be managed by the RMS 120.

At step 240, the BS 123-1, based on successful authentication of the MD 110-X, makes managed device credentials for the MD 110-X available for use in authenticating use of the RMS 120 by the MD 110-X. The BS 123-1 obtains managed device credentials for the MD 110-X (e.g., generates the managed device credentials, retrieves the managed device credentials, or the like). The managed device credentials for MD 110-X are credentials which may be used by the MD 110-X to access the RMS 120 (e.g., for use by DMSs 122 in authenticating the MD 110-X when interacting with the MD 110-X). The BS 123-1 stores the managed device credentials for the MD 110-X as part of the managed device authentication information 127 of managed device authentication database 126 (e.g., as a mapping of a device identifier of the MD 110-X to the managed device credentials for the MD 110-X). The BS 123-1 sends a bootstrap response to the MD 110-X. The bootstrap response includes a load balancer address of the LB 130 that is associated with the set of DMSs 122 of the RMS 120 (illustratively, a virtual IP (VIP) address of the LB 130 that is associated with the set of DMSs 122 of the RMS 120) and the managed device credentials for the MD 110. The MD 110-X stores the managed device credentials for the MD 110-X for use in communicating with the RMS 120, such that the RMS 120 is able to authenticate the MD 110-X as being authorized for management by the RMS 120.

At step 250, the MD 110-X sends to the LB 130 a message intended for the RMS 120 (i.e., intended for handling by one of the DMSs 122 of the RMS 120). The message intended for the RMS 120 may be a connection request, a management message, or the like. The message intended for the RMS 120 includes the information from the bootstrap response (namely, the load balancer address of the LB 130 that is associated with the set of DMSs 122 of the RMS 120 (illustratively, the VIP address of the LB 130 that is associated with the set of DMSs 122 of the RMS 120) and the managed device credentials for the MD 110-X). The message intended for the RMS 120 may be a TR-069 Inform message.

At step 260, the LB 130 sends the message intended for the RMS 120 to one of the DMSs 122 of the RMS 120 (illustratively, DMS 122-M). The LB 130 selects the DMS 122-M of the RMS 120 for the message intended for the RMS 120 and provides the message intended for the RMS 120 to the DMS 122-M of the RMS 120. The LB 130 may select the DMS 122-M for the message intended for the RMS 120 based on any suitable load balancing technique. At this point, the MD 110-X is fully registered with the RMS 120 and under management by the RMS 120.

As discussed herein, following registration of the MD 110-X with the RMS 120 such that the MD 110-X is under management by the RMS 120, the managed device credentials of the MD 110-X that are maintained by the MD 110-X and the managed device credentials of the MD 110-X that are maintained by the RMS 120 (e.g., as part of the managed device authentication information 127 of the managed device authentication database 126) may become out of synch. This may occur for various reasons, such as software defects, changes of settings outside of the RMS (ACS), corruption of saved managed device credentials (e.g., at the MD 110-X or at the RMS 120), or the like. As a result of this lack of synchronization of the managed device credentials of the MD 110-X that are maintained by the MD 110-X and the managed device credentials of the MD 110-X that are maintained by the RMS 120, the MD 110-X will no longer be successfully authenticated when communicating with the RMS 120. The process of FIG. 3 is configured to support automatic recovery of the MD 110-X by automatically correcting the lack of synchronization of the managed device credentials of the MD 110-X that are maintained by the MD 110-X and the managed device credentials of the MD 110-X that are maintained by the RMS 120.

FIG. 3 depicts an example process, within the context of the example communication system of FIG. 1, for supporting automatic recovery for a remote management service.

The automatic recovery process 300 of FIG. 3 is a process by which an MD 110 (namely, MD 110-X as discussed with respect to bootstrap process 200 of FIG. 2) is automatically recovered such that the MD 110 is registered with the RMS 120 and under management of the RMS 120.

The automatic recovery process 300 of FIG. 3 is presented within the context of the communication system 100 of FIG. 1 and includes a set of steps which may be performed by elements of the communication system 100 of FIG. 1 for supporting automatic recovery of one of the MDs 110 (again, MD 110-X as discussed with respect to bootstrap process 200 of FIG. 2).

At step 310, the MD 110-X sends to the LB 130 a message intended for the RMS 120 (i.e., intended for handling by one of the DMSs 122 of the RMS 120). The message intended for the RMS 120 may be a boot event message, a value change event message, or other management message. The message intended for the RMS 120 includes a load balancer address of the LB 130 that is associated with the set of DMSs 122 of the RMS 120 (illustratively, the VIP address of the LB 130 that is associated with the set of DMSs 122 of the RMS 120) and the managed device credentials for the MD 110-X. The MD 110-X may have obtained the load balancer address of the LB 130 that is associated with the set of DMSs 122 of the RMS 120 and the managed device credentials for the MD 110-X based on a bootstrap process previously performed by the MD 110-X (e.g., process 200 of FIG. 2 where it will be appreciated that this step 310 may be similar to step 250 of bootstrap process 200 of FIG. 2). For example, the message may be a TR-069 Inform message intended for the RMS 120.

At step 320, the LB 130 sends the message intended for the RMS 120 to one of the DMSs 122 of the RMS 120 (illustratively, DMS 122-1). The LB 130 selects the DMS 122-1 of the RMS 120 for the message intended for the RMS 120 and provides the message intended for the RMS 120 to the DMS 122-1 of the RMS 120. The LB 130 may select the DMS 122-1 for the message intended for the RMS 120 based on any suitable load balancing technique.

At step 330, the DMS 122-1 determines whether the MD 110-X is authorized to be managed by the RMS 120. The DMS 122-1 determines whether the MD 110-X is authorized to be managed by the RMS 120 based on the managed device credentials in the message intended for the RMS 120. The DMS 122-1 may authenticate the MD 110-X based on the managed device authentication information 127 that is available to the RMS 120. For example, the DMS 122-1 may retrieve comparative managed device credentials for MD 110-X from the managed device authentication information 127 of the managed device authentication database 127 (e.g., based on an identifier of the MD 110-X) and compare the managed device credentials received in the message intended for the RMS 120 and the comparative managed device credentials for MD 110-X that are retrieved from the managed device authentication information 127 of the managed device authentication database 127 to determine whether or not the MD 110-X is authorized to be managed by the RMS 120. For example, although omitted from FIG. 3 for purposes of clarity, the DMS 122-1 may send an identifier of the MD 110-X and the managed device credentials to an authenticating device configured to compare the managed device credentials received in the message intended for the RMS 120 and the comparative managed device credentials for MD 110-X (e.g., the authenticating device has access to the managed device authentication information 127 of the managed device authentication database 126 or maintains the managed device authentication information 127 in place of the managed device authentication database 126) and then receives a response that is indicative as to whether or not the MD 110-X is authorized to be managed by the RMS 120. Here, it is assumed that the MD 110-X is not authenticated by the DMS 122-1 as being authorized to be managed by the RMS 120 (e.g., the managed device credentials for MD 110-X do not match due to a loss of synchronization between the managed device credentials of the MD 110-X that are maintained by the MD 110-X and the managed device credentials of the MD 110-X that are maintained by the RMS 120 as part of the managed device authentication information 127).

At step 340, the DMS 122-1 sends to the LB 130 a response message indicative of an error associated with processing of the message intended for the RMS 120. The response message indicative of the error associated with processing of the message intended for the RMS 120 may be indicative that an authentication failure occurred.

At step 350, the LB 130 triggers MD 110-X to enter a bootstrap process (e.g., the bootstrap process 200 of FIG. 2) based on recognition by the LB 130 of the authentication failure of the MD 110-X.

The LB 130 may trigger the MD 110-X to enter a bootstrap process based on a determination that a threshold number of authentication failures for the MD 110-X have been detected. This threshold number of authentication failures for the MD 110-X may be counted since a last successful authentication of the MD 110-X by the RMS 120. Here, it is assumed that the response message indicative of the authentication failure for MD 110-X has satisfied the threshold number of authentication failures for the MD 110-X that is being monitored by the LB 130 and, thus, that the LB 130 triggers MD 110-X to enter a bootstrap process. It will be appreciated that, although omitted for purposes of clarity, if the response message indicative of the authentication failure for MD 110-X did not satisfy the threshold number of authentication failures for the MD 110-X that is being monitored by the LB 130 then, rather than triggering the MD 110-X to enter a bootstrap process, may forward the response message (or some other message indicative of the error) to the MD 110-X.

The LB 130 may trigger the MD 110-X to enter a bootstrap process by sending a response message indicative that the MD 110-X is to enter a bootstrap process. The response message indicative that the MD 110-X is to enter a bootstrap process may include bootstrap information associated with the RMS 120. The bootstrap information associated with the RMS 120 may include a load balancer address of LB 130 that is associated with bootstrap functions supported by the RMS 120 (illustratively, the VIP address of the LB 130 that is associated with the set of BSs 123 of RMS 120) and bootstrap credentials include credentials which the RMS 120 (illustratively, one of the BSs 123 of RMS 120) may use to verify that the MD 110-X is authorized to be managed by the RMS 120.

At step 360, MD 110-X sends a bootstrap request message to the LB 130. The bootstrap request message includes the bootstrap information associated with the RMS 120, which is received from the LB 130, which includes the load balancer address of the LB 130 that is associated with the set of BSs 123 of the RMS 120 (illustratively, the VIP address of the LB 130 that is associated with the set of BSs 123 of the RMS 120) and the bootstrap credentials. The bootstrap credentials include credentials which the RMS 120 (illustratively, one of the BSs 123 of RMS 120) may use to verify that the MD 110-X is authorized to be managed by the RMS 120. The bootstrap message may be a TR-069 bootstrap Inform message. It is noted that this step 360 may be similar to step 210 of the bootstrap process 200 of FIG. 2.

At step 370, the LB 130 sends the bootstrap request of the MD 110-X to one of the BSs 123 of the RMS 120 (illustratively, BS 123-1). The LB 130 selects the BS 123-1 of the RMS 120 for the bootstrap request of the MD 110-X and provides the bootstrap request of the MD 110-X to the BSs 123-1 of the RMS 120. The LB 130 may select the BS 123-1 for the bootstrap request of the MD 110-X based on any suitable load balancing technique. It is noted that this step 370 may be similar to step 220 of the bootstrap process 200 of FIG. 2.

Figure 4:
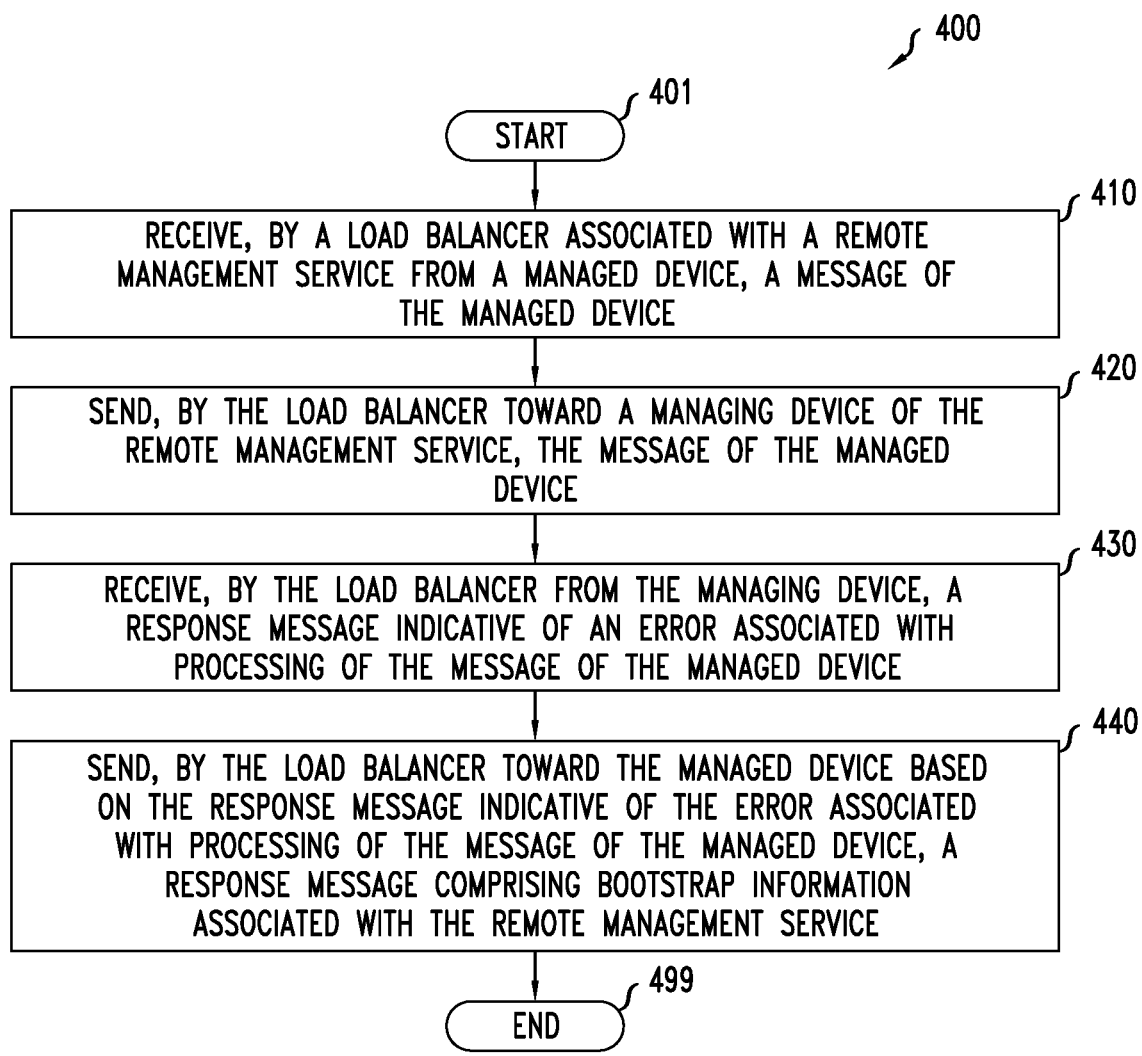
FIG. 4 depicts an embodiment of a method for use by a load balancer to support automatic recovery for a remote management service.

FIG. 4 depicts an embodiment of a method for use by a load balancer to support automatic recovery for a remote management service. It will be appreciated that the functions of method 400, although presented in FIG. 4 as being performed serially, may be performed contemporaneously or in a different order than as presented in FIG. 4. At block 401, method 400 begins. At block 410, the load balancer receives, from a managed device, a message of the managed device. At block 420, the load balancer sends, toward a managing device of the remote management service, the message of the managed device. At block 430, the load balancer receives, from the managing device, a response message indicative of an error associated with processing of the message of the managed device. At block 440, the load balancer sends, toward the managed device based on the response message indicative of the error associated with processing of the message of the managed device, a response message comprising bootstrap information associated with the remote management service. At block 499, method 400 ends. It will be appreciated that method 400 of FIG. 4 may be adapted to perform various other functions presented herein as being supported by a load balancer (e.g., LB 130 of FIG. 1, FIG. 2, and FIG. 3) to handle automatic recovery for a remote management service.

Figure 5:
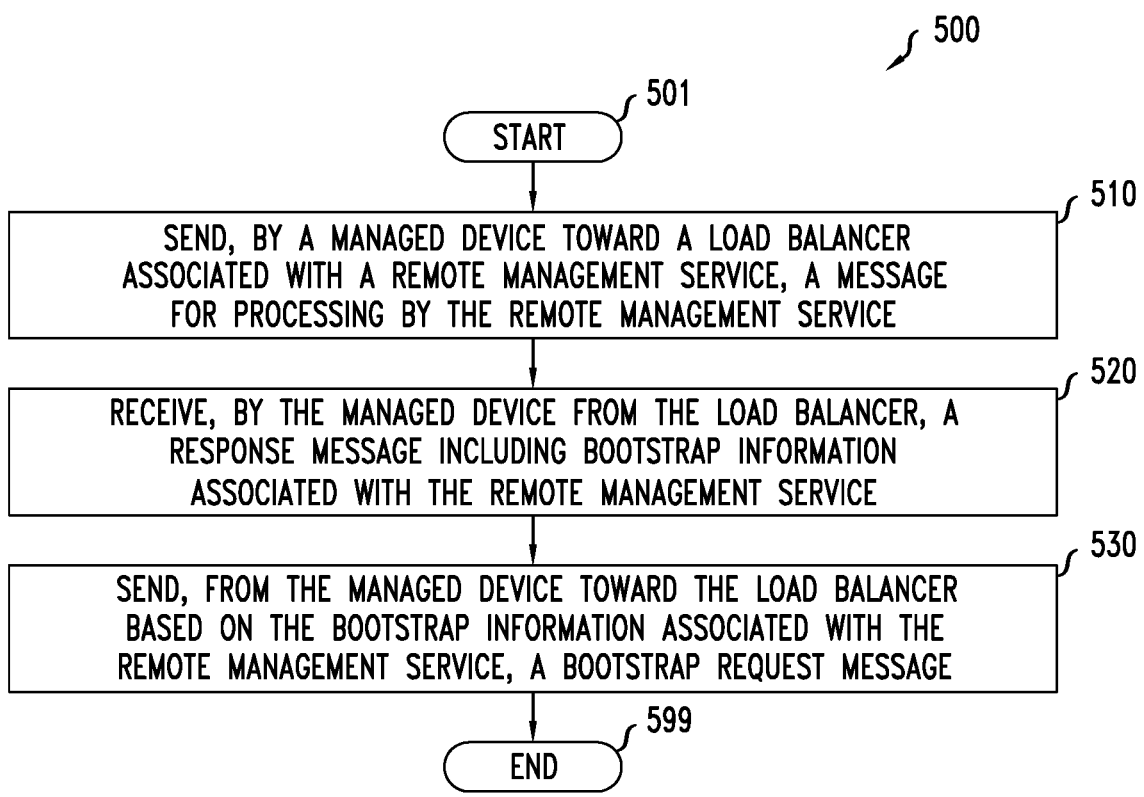
FIG. 5 depicts an embodiment of a method for use by a managed device to support automatic recovery for a remote management service.

FIG. 5 depicts an embodiment of a method for use by a managed device to support automatic recovery for a remote management service. It will be appreciated that the functions of method 500, although presented in FIG. 5 as being performed serially, may be performed contemporaneously or in a different order than as presented in FIG. 5. At block 501, method 500 begins. At block 510, the managed device sends, toward a load balancer associated with the remote management service, a message for processing by the remote management service. At block 520, the managed device receives, from the load balancer, a response message including bootstrap information associated with the remote management service. At block 530, the managed device sends, from the managed device toward the load balancer based on the bootstrap information associated with the remote management service, a bootstrap request message. At block 599, method 500 ends. It will be appreciated that method 500 of FIG. 5 may be adapted to perform various other functions presented herein as being supported by a managed device (e.g., MD 110 of FIG. 1, FIG. 2, and FIG. 3) to handle automatic recovery for a remote management service.

It will be appreciated that various embodiments of the RMS automatic recovery capability may provide various advantages or potential advantages. For example, various embodiments of the RMS automatic recovery capability may be configured to support an automated recovery capability such that an operator may automatically recover unmanageable devices that have become unmanageable due to authentication/credential issues. For example, various embodiments of the RMS automatic recovery capability may be configured to support recovery of devices for RMSs of various scales (even large scale RMSs which may be providing remote management for millions of devices, tens of millions of devices, or even larger numbers of devices). It will be appreciated that various embodiments of the RMS automatic recovery capability may provide various other advantages or potential advantages.

Figure 6:
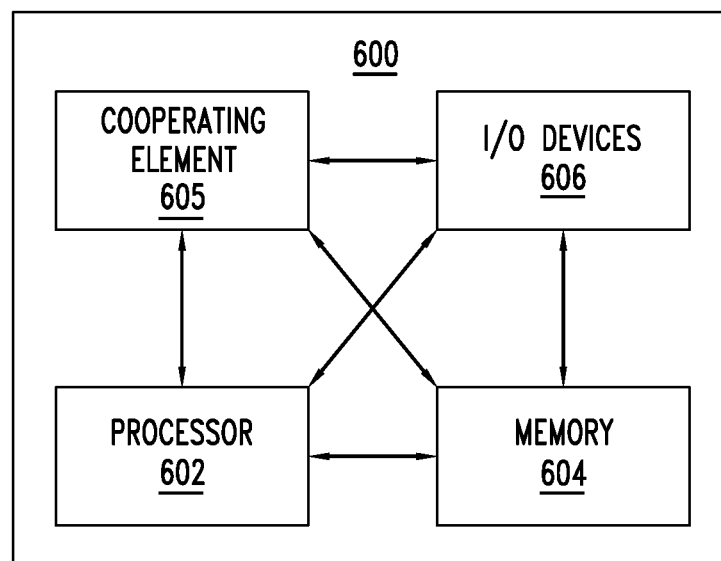
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of processor cores, or the like) and a memory 604 (e.g., a random access memory (RAM), a read only memory (ROM), or the like). The processor 602 and the memory 604 are communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of a MD 110, an ACS 121, a DMS 122, a BS 123, managed device authentication database 126, OSS 128, LB 130, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus configured to support recovery in a remote management service, the apparatus comprising:
   at least one processor; and
   at least one memory including computer program code;
   wherein the at least one memory and the computer program code are configured to, with the at least one processor, cause a load balancer associated with the remote management service to at least:
   receive, from a managed device, a message of the managed device;
   send, toward a managing device of the remote management service, the message of the managed device;
   receive, from the managing device, a response message indicative of an error associated with processing of the message of the managed device;
   send, toward the managed device based on the response message indicative of the error associated with processing of the message of the managed device, a response message comprising bootstrap information associated with the remote management service, wherein the bootstrap information includes bootstrap credentials configured to support verification by the remote management service that the managed device is authorized to be managed by the remote management service;
   receive, from the managed device, a bootstrap request message including the bootstrap credentials; and
   send, toward a bootstrap server of the remote management service that is configured to support sending of managed device credentials to the managed device based on verification of the bootstrap credentials, the bootstrap request message including the bootstrap credentials.

2. The apparatus of claim 1, wherein the message of the managed device comprises:
   a load balancer address of the load balancer that is associated with the managing device of the remote management service; and
   managed device credential information associated with the managed device.

3. The apparatus of claim 2, wherein the at least one memory and the computer program code are configured to, with the at least one processor, cause the load balancer associated with the remote management service to at least:
   receive, from the managed device, an initial bootstrap request comprising default bootstrap information associated with the remote management service;
   send, toward a bootstrap server of the remote management service, the initial bootstrap request;
   receive, from the bootstrap server, an initial bootstrap response; and
   send, toward the managed device, the initial bootstrap response.

4. The apparatus of claim 3, wherein the default bootstrap information comprises:
   a load balancer address of the load balancer that is associated with the bootstrap server; and
   default bootstrap credentials for the bootstrap server of the remote management service.

5. The apparatus of claim 3, wherein the initial bootstrap response comprises the load balancer address of the load balancer that is associated with the managing device of the remote management service and the managed device credential information associated with the managed device.

6. The apparatus of claim 1, wherein the bootstrap information further includes a load balancer address of the load balancer that is associated with a set of bootstrap servers of the remote management service.

7. The apparatus of claim 1, wherein the response message indicative of the error associated with processing of the message of the managed device comprises an error code.

8. The apparatus of claim 7, wherein the message of the managed device is received via a Hypertext Transfer Protocol (HTTP) connection, wherein the response message indicative of the error associated with processing of the message of the managed device comprises a 401 error code.

9. The apparatus of claim 1, wherein the at least one memory and the computer program code are configured to, with the at least one processor, cause the load balancer associated with the remote management service to at least:
   determine, based on the response message indicative of the error associated with processing of the message of the managed device, whether a number of error messages associated with the managed device that have been received by the load balancer satisfies a threshold; and
   send the response message comprising the bootstrap information associated with the remote management service based on a determination that the number of error messages associated with the managed device that have been received by the load balancer satisfies the threshold.

10. The apparatus of claim 1, wherein the remote management service comprise an Automatic Configuration Service, wherein the managing device comprises an Automatic Configuration Server (ACS), wherein the managed device comprises a network equipment (NE) or a customer premises equipment (CPE), wherein the message of the managed device is a TR-069 message.

11. The apparatus of claim 1, wherein the bootstrap request message is configured to request managed device credentials configured to support access by the managed device to the remote management service.

12. The apparatus of claim 1, wherein the at least one memory and the computer program code are configured to, with the at least one processor, cause the load balancer associated with the remote management service to at least:
receive, from the bootstrap server of the remote management service based on verification of the bootstrap credentials, a bootstrap response message including managed device credentials configured to support access by the managed device to the remote management service; and
send, toward the managed device, the bootstrap response message including the managed device credentials configured to support access by the managed device to the remote management service.

13. The apparatus of claim 12, wherein the at least one memory and the computer program code are configured to, with the at least one processor, cause the load balancer associated with the remote management service to at least:
receive, from the managed device, a second message of the managed device that includes the managed device credentials configured to support access by the managed device to the remote management service; and
send, toward a managing device of the remote management service, the second message of the managed device.

14. A method for supporting recovery in a remote management service, the method comprising:
receiving, by a load balancer associated with the remote management service from a managed device, a message of the managed device;
sending, by the load balancer toward a managing device of the remote management service, the message of the managed device;
receiving, by the load balancer from the managing device, a response message indicative of an error associated with processing of the message of the managed device;
sending, by the load balancer toward the managed device based on the response message indicative of the error associated with processing of the message of the managed device, a response message comprising bootstrap information associated with the remote management service, wherein the bootstrap information includes bootstrap credentials configured to support verification by the remote management service that the managed device is authorized to be managed by the remote management service;
receiving, by the load balancer from the managed device, a bootstrap request message including the bootstrap credentials; and
sending, toward a bootstrap server of the remote management service that is configured to support sending of managed device credentials to the managed device based on verification of the bootstrap credentials, the bootstrap request message including the bootstrap credentials.

15. An apparatus configured to support recovery in a remote management service, the apparatus comprising:
at least one processor; and
at least one memory including computer program code;
wherein the at least one memory and the computer program code are configured to, with the at least one processor, cause a managed device associated with the remote management service to at least:
send, toward a load balancer associated with the remote management service, a message for processing by the remote management service;
receive, from the load balancer, a response message including bootstrap information associated with the remote management service, wherein the bootstrap information includes bootstrap credentials configured to support verification by the remote management service that the managed device is authorized to be managed by the remote management service;
send, toward the load balancer based on the bootstrap information associated with the remote management service, a bootstrap request message including the bootstrap credentials; and
receive, from a bootstrap server of the remote management service, a bootstrap response message including managed device credentials configured to support access by the managed device to the remote management service.

16. The apparatus of claim 15, wherein the message for processing by the remote management service comprises:
a load balancer address of the load balancer that is associated with a set of managing devices of the remote management service; and
managed device credential information associated with the managed device.

17. The apparatus of claim 16, wherein the load balancer address of the load balancer that is associated with the set of managing devices of the remote management service comprises a virtual Internet Protocol (IP) address of the load balancer that is associated with the set of managing devices of the remote management service.

18. The apparatus of claim 16, wherein the at least one memory and the computer program code are configured to, with the at least one processor, cause the managed device associated with the remote management service to at least:
send, toward the load balancer, an initial bootstrap request comprising default bootstrap information; and
receive, from the load balancer responsive to the initial bootstrap request, the load balancer address of the load balancer that is associated with the set of managing devices of the remote management service and the managed device credential information associated with the managed device.

19. The apparatus of claim 18, wherein the default bootstrap information comprises:
a second load balancer address of the load balancer that is associated with a set of bootstrap servers of the remote management service; and
default bootstrap credentials for the set of bootstrap servers of the remote management service.

20. The apparatus of claim 16, wherein the bootstrap information associated with the remote management service further includes a second load balancer address of the load balancer that is associated with a set of bootstrap servers of the remote management service.

21. The apparatus of claim 15, wherein the bootstrap information associated with the remote management service further includes a load balancer address of the load balancer that is associated with a set of bootstrap servers of the remote management service.

22. The apparatus of claim 21, wherein the load balancer address of the load balancer that is associated with the set of bootstrap servers of the remote management service comprises a virtual Internet Protocol (IP) address of the load balancer.

23. The apparatus of claim 21, wherein the bootstrap request message further includes the load balancer address of the load balancer that is associated with the set of bootstrap servers of the remote management.

24. The apparatus of claim 15, wherein the remote management service comprise an Automatic Configuration Service, wherein the managed device comprises a network equipment (NE) or a customer premises equipment (CPE), wherein the message intended for the remote management service is a TR-069 message.

25. A method for supporting recovery in a remote management service, the method comprising:

sending, by a managed device toward a load balancer associated with the remote management service, a message for processing by the remote management service;

receiving, by the managed device from the load balancer, a response message including bootstrap information associated with the remote management service, wherein the bootstrap information includes bootstrap credentials configured to support verification by the remote management service that the managed device is authorized to be managed by the remote management service;

sending, from the managed device toward the load balancer based on the bootstrap information associated with the remote management service, a bootstrap request message including the bootstrap credentials; and receiving, from a bootstrap server of the remote management service, a bootstrap response message including managed device credentials configured to support access by the managed device to the remote management service.

* * * * *